(12) United States Patent  
Roberts et al.

(10) Patent No.: US 8,745,665 B2  
(45) Date of Patent: Jun. 3, 2014

(54) INTELLIGENT VIDEO PLAYLISTS (75) Inventors: Brian F. Roberts, Dallas, TX (US);  
Donald H. Relyea, Jr., Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 551 days.

(21) Appl. No.: 12/749,738

(22) Filed: Mar. 30, 2010

(65) Prior Publication Data

US 2011/0247038 A1 Oct. 6, 2011

(51) Int. Cl.  
*H04N 5/445* (2011.01)

(52) U.S. Cl.  
USPC .............................................. 725/46; 386/125

(58) Field of Classification Search  
CPC .............. H04N 21/41; H04N 21/4334; H04N 21/4335; H04N 21/4532; H04N 21/4825; H04N 21/4826  
USPC ............................................ 725/46; 386/125  
See application file for complete search history.

(56) References Cited

U.S. PATENT DOCUMENTS

| | | | |
|---|---|---|---|
| 2005/0022239 A1* | 1/2005 | Meuleman | 725/46 |
| 2006/0078307 A1* | 4/2006 | Kelly | 386/107 |
| 2006/0143644 A1* | 6/2006 | Verhaegh et al. | 725/4 |
| 2007/0180057 A1* | 8/2007 | McEnroe | 709/218 |
| 2007/0186241 A1* | 8/2007 | Sugimoto et al. | 725/46 |
| 2009/0100478 A1* | 4/2009 | Craner et al. | 725/87 |

* cited by examiner

*Primary Examiner* — Benjamin R Bruckart  
*Assistant Examiner* — Anthony Bantamoi

(57) ABSTRACT

A computing device identifies an active user profile, from multiple user profiles, associated with the device and retrieves from an index of stored DVR content, titles for the stored DVR content that are associated with the user profile. The computing device ranks the titles associated with the user profile and generates a list of the titles based on the ranking. The computing device then provides, via a display device and based on the order of the list of the indicators, recommended titles of DVR content for a user to view.

23 Claims, 9 Drawing Sheets

INTELLIGENT VIDEO PLAYLISTS

BACKGROUND

Subscription multimedia services (e.g., from service providers using cable, satellite, etc.) provide digital video recorder (DVR) capabilities through local devices on customers' premises and/or through storage at remote servers. A user may record content from a service provider (e.g., video or other multimedia content) that may be retrieved and viewed at a later time. DVR systems generally have limited memory capacity, and, in some cases, this memory may be shared among multiple users. One user may be required to sort through recorded programs of other users to retrieve a desired program. Also, to make room for new recordings, older recordings may need to be overwritten—sometimes before they have been viewed by an intended user.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a prioritized list of DVR recordings, referred to herein as a playlist, for one or more user profiles in a subscription multimedia service. The playlist may be generated and implemented within a subscription DVR service having content stored at a subscriber's premises or at a remote facility. The playlist may include titles of stored content that are ranked based on tendencies/preferences associated with a particular user profile. In implementations described herein, the playlist may be used to present, to a user, one or more stored programs from the playlist in order of a current ranking. Content may be associated with a playlist for a particular profile or with multiple playlists for multiple profiles.

"Content," as the term is used herein, is to be broadly construed to include, for example, short form video segments (e.g., music videos, television (TV) programs, video clips, etc.), long form video segments (e.g., movies), music files, games, publications, user-generated content (e.g., home videos, personal videos, on-line video service-based videos, etc.), etc., whether provided by a subscription multimedia service or an over-the-top (OTT) content source.

Figure 1:
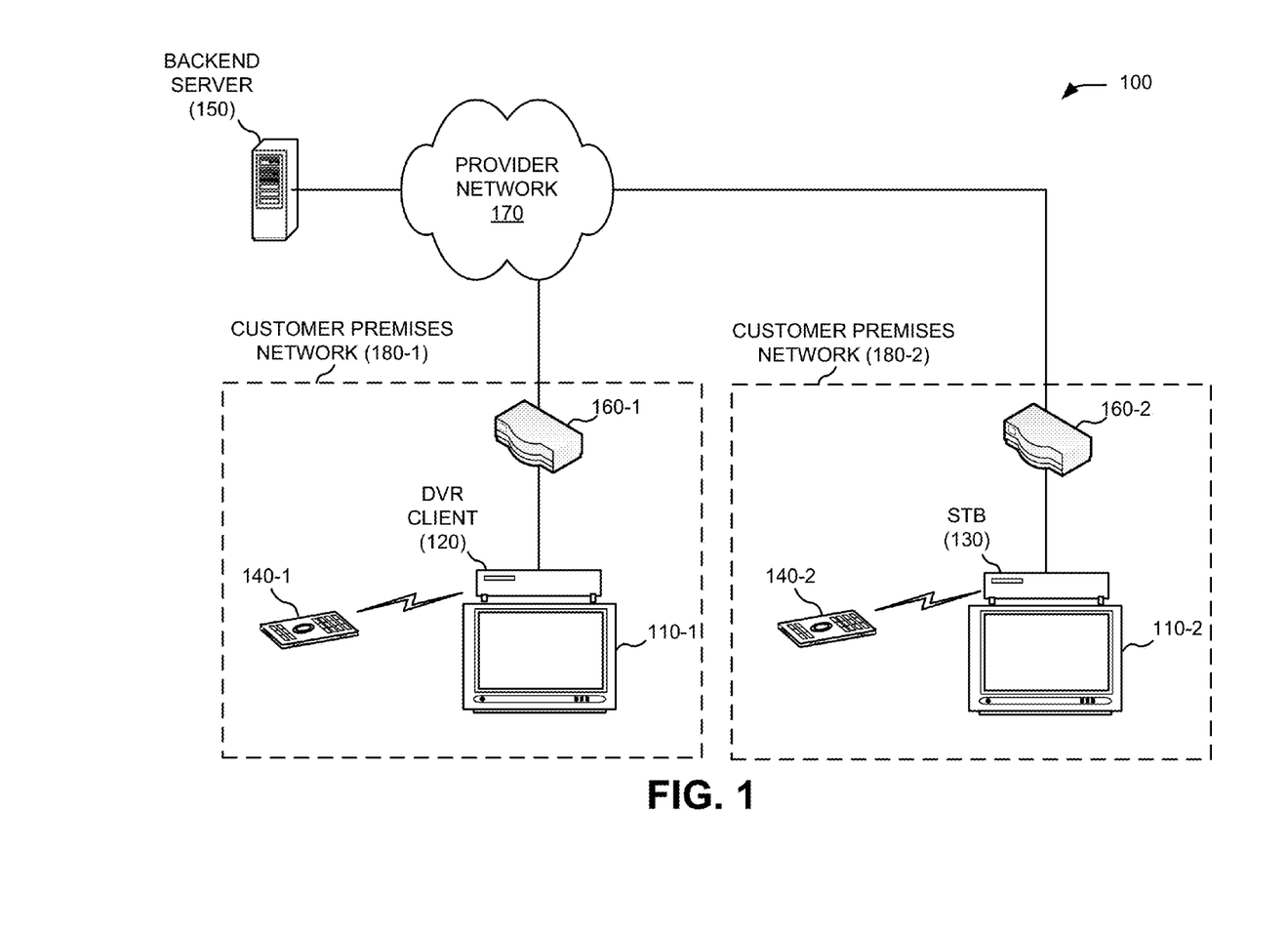
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include video display devices 110-1 and 110-2 (herein referred to collectively as "video display devices 110" and generically as "video display device 110"), a DVR client 120, a STB 130, remote controls 140-1 and 140-2 (herein referred to collectively as "remote controls 140" and generically as "remote control 140"), local gateways 160-1 and 160-2 (herein referred to collectively as "gateways 160" and generically as "gateway 160"), a backend server 150, a provider network 170, and customer premises networks 180-1 and 180-2 (herein referred to collectively as "customer premises networks 180" and generically as "customer premises network 180"). Components of network 100 may interconnect via wired and/or wireless connections. Two video display devices, two DVR clients, two remote controls, one content server, two gateways, one provider network, and two customer premises network have been illustrated in FIG. 1 for simplicity. In practice, there may be more video display devices, DVR clients, remote controls, content servers, gateways, networks, and/or customer premises network. Also, in some instances, one or more of the components of network 100 may perform one or more functions described as being performed by another one or more of the components of network 100.

Video display device 110 may include any digital or analog display that is capable of displaying television programming, content provided by DVR client 120, video client 130, and/or other devices (e.g., a digital video disk (DVD) player, a video camera, an Internet connection, an antenna, etc., not shown) connected to video display device 110. Video display device 110 may include technologies, such as cathode ray tube (CRT) displays, liquid crystal displays (LCDs), light-emitting diode (LED) displays, plasma displays, etc.

DVR client 120 may include a device for selecting, obtaining (e.g., from backend server 150), and/or recording content that may be shown or played on video display device 110 or another device. Examples of DVR client 120 may include a STB with an integrated DVR (STB/DVR), a computer, and a portable electronic device with integrated DVR functionality. DVR client 120 may allow a user to alter programming provided to video display device 110 based on a signal (e.g., a channel up or channel down signal) from remote control 140. DVR client 120 may receive a television (or other programming) signal from backend server 150 (e.g., via provider network 170 and gateway 160), may convert the signal to a form usable by video display device 110, and may transmit the signal to video display device 110 for display. DVR client 120 may include one or more tuners (e.g., radio frequency (RF) tuners) to receive television (or other multimedia) signals from backend server 150. DVR client 120 may also record video in a digital format to a disk drive or other memory medium within DVR client 120. DVR client 120 may create and store an index of recorded DVR content. The index may include, for example, titles, unique identifiers, and other metadata for the recorded DVR content. In one implementation, some or all functionalities of DVR client 120 may be incorporated directly within video display device 110. DVR client 120 may also communicate with other devices (e.g. other DVRs, STBs, computing devices, etc.) within a customer premises network (e.g., customer premises network 180-1) or outside the customer premises network (e.g., via provider network 170). In one implementation, DVR client 120 may store viewing history information to send at a later point in time, such as when requested by backend server 110, at a particular interval, or as viewing events occur.

STB 130 may include a device for selecting and/or obtaining (e.g., from backend server 150) content that may be shown or played on video display device 110 or another device. STB 130 may include features similar to that of DVR client 120, with a notable exception that STB 130 may not include the ability to locally record/store video in a digital format. Examples of STB 130 may include a set-top box, a computer, a cable card, and a portable electronic device. In one implementation, STB 130 may include a device (e.g., an Internet Protocol (IP)-based device) that is capable of communicating with another device (e.g., another DVR) within a customer premises network (e.g., customer premises network 180-2) or another device (e.g., backend server 150) outside the customer premises network (e.g., via provider network 170) to store and retrieve DVR content. In one implementation, STB 130 may generate/store a playlist locally, while relying on backend server 150 for stored DVR content. In another implementation, STB 130 may access a roaming profile (e.g., stored at backend server 150) to retrieve/modify a particular playlist.

Generally, DVR client 120 and STB 130 may both provide DVR functionality to users and may be referred to herein collectively as "DVR clients 120/130" and generically as "DVR client 120/130".

Remote control 140 may include a device that allows a user to control programming and/or content displayed on one or more of video display devices 110 via interaction with DVR clients 120/130. Remote control 140 may transmit signals, such as, for example, infrared signals, to a signal receiver associated with video display devices 110 and/or DVR client 120/130.

Backend server 150 may include one or more server entities, or other types of computation or communication devices, that gather, process, search, and/or provide information in a manner described herein. In one implementation, backend server 150 may include one or more devices for providing content/information to video display devices 110 and/or DVR clients 120/130. Backend server 150 may include a server device for a subscription multimedia service (e.g., cable, satellite, or another subscription programming service). Examples of backend server 150 may include a headend device that provides broadcast television programs and/or pay per view (PPV) events, a video-on-demand (VOD) device or another device that provides multimedia content upon request, and a program guide information server that provides information related to multimedia content available to customer premises networks 180. In one implementation, backend server 150 may communicate with another server or a database to supply stored content upon a request from, for example, STB 130. In another implementation, backend server 150 may store both playlists and stored content for the playlists.

Backend server 150 may provide content to DVR clients 120/130 (e.g., for viewing on video display devices 110). Backend server 150 may receive content, may filter content (e.g., may review and approve content from a legal perspective (e.g., a check against potential copyright issues)), and may transform the filtered content into a TV-compatible format (e.g., a TV-compatible video CODEC (MPEG 2 or MPEG 4)) for use by DVR clients 120/130.

Gateway 160 may include a network device that provides an interface from provider network 170 to DVR clients 120/130 and/or other network connectivity devices (not shown). Gateway 160 may include one of a number of possible gateway devices, including a satellite antenna and receiver, a coaxial cable connection, an optical network terminal (ONT), or a broadband access for Internet Protocol TV (IPTV). For example, when telecommunication services are provided to the customer's premises via an optical fiber, gateway 160 may include an ONT that connects to the optical fiber. The ONT may convert between signals appropriate for video display devices 110 and signals appropriate for transmission over optical fiber. For example, the ONT may include a coaxial cable connection that leads to video display device 110 or DVR client 120/130. The ONT may also include an Ethernet output port that connects to a personal computer or a VoIP telephone.

Provider network 170 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks. Although shown as a single element in FIG. 1, network 170 may include a number of separate networks that function to provide services to devices, such as video display devices 110, within customer premises networks 180. In one implementation, network 170 may terminate at the customer's premises via an optical communication link, such as an optical fiber provided to the customer's premises. In another possible implementation, network 170 may terminate at the customer's premises via a coaxial cable. In still another implementation, network 170 may terminate at the customer's premises via a wireless (e.g., satellite) connection.

Customer premises networks 180 may include video display devices 110, DVR clients 120/130, remote controls 140, and/or local gateways 160. Devices within customer premises network 180 may be connected via wired (e.g., coaxial cable) or wireless connections (e.g., using network devices such as those available under the IEEE 802.11 wireless LAN standards). Customer premises network 180 may also be referred to herein as a home network or a home computer network.

In implementations described herein, DVR client 120/130 may identify a profile associated with a user (e.g., user of display device 110/remote control 140). Profiles may be managed by a local device (e.g., DVR client 120/130) and/or by backend server 150. When a user is using DVR functionality, DVR client 120/130 may present a playlist that includes previously recorded titles associated with the active user profile. Recorded content in the playlist may be automatically ranked based on a variety of profile tendencies, such as frequency of recordings (e.g., of programs within a series), passive/active viewing, recorded program expiration, etc. In one implementation, after each recorded program ends, DVR client 120/130 may prompt a user to view (1) the next-highest ranked content from the playlist, (2) another item from the playlist, or (3) the option to exit from DVR mode. In another implementation, recorded content or to-be-recorded content may be tagged with one or more profiles so as to appear on a playlist for one or more profiles.

Figure 2:
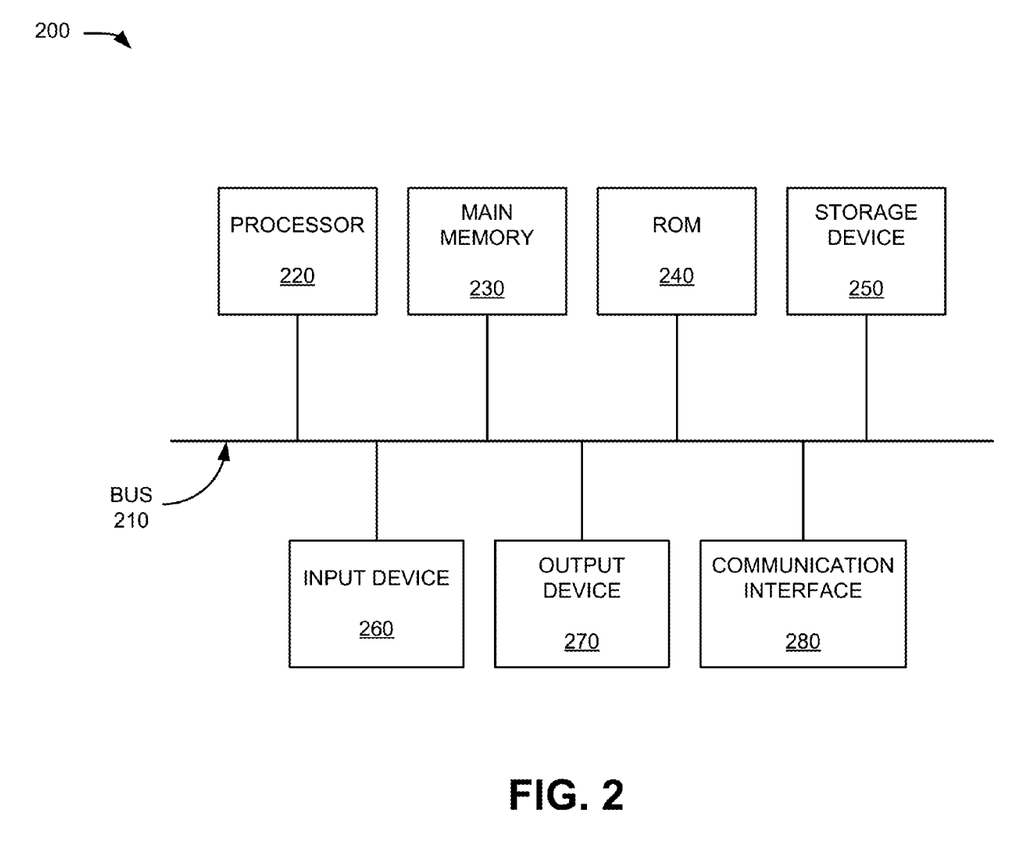
FIG. 2 is a diagram of exemplary components of one of the devices depicted in FIG. 1.

FIG. 2 is an exemplary diagram of a device 200 that may correspond to any of DVR client 120/130 and/or backend server 150. As illustrated, device 200 may include a bus 210, a processor 220, a main memory 230, a read-only memory (ROM) 240, a storage device 250, an input device 260, an output device 270, and/or a communication interface 280. Bus 210 may include a path that permits communication among the components of device 200.

Processor 220 may include a processor, microprocessor, or a type of processor that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220.

Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 140, etc. Output device 270 may include a mechanism that outputs information to a user, including an integrated display, a connected display device (e.g., display device 110), a speaker, etc. Communication interface 280 may include any transceiver-like mechanism that enables device 200 to communicate with other devices and/or systems. For example, communication interface 280 may include mechanisms for communicating with another device or system via a network, such as provider network 170 and/or customer premises network 180.

As described herein, device 200 may perform certain operations in response to processor 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
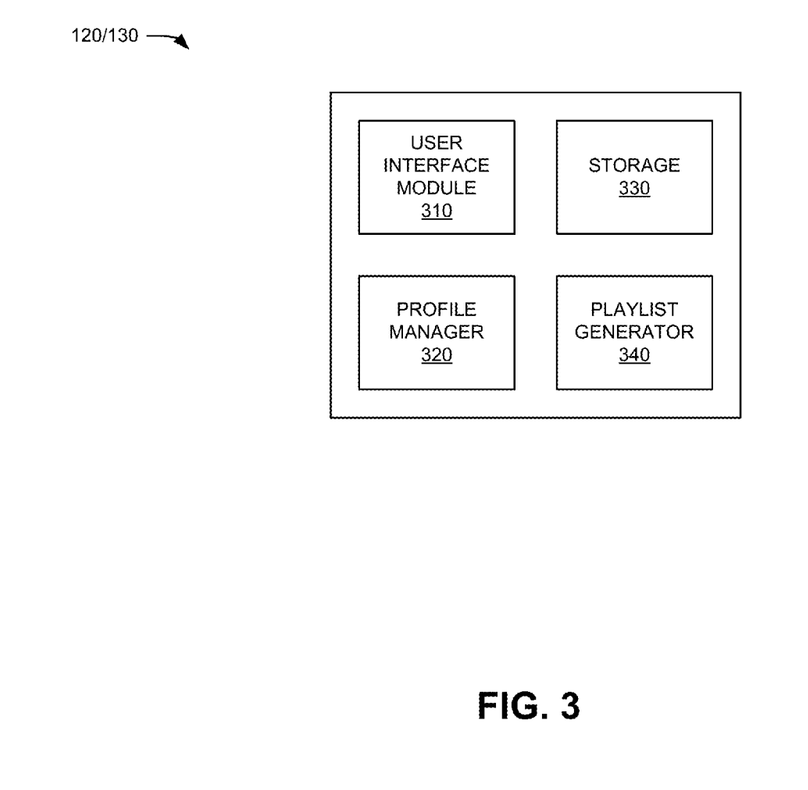
FIG. 3 is a diagram of exemplary functional components of a content server, a DVR client and/or a set-top box (STB) depicted in FIG. 1.

FIG. 3 illustrates a diagram of exemplary functional components of DVR client 120/130. In another implementation, one or more of the functional components of FIG. 3 may be included within a combination of DVR client 120/130 and backend server 150. As illustrated, DVR client 120/130 may include a user interface module 310, a profile manager 320, storage 330, and a playlist generator 340. The functions described in FIG. 3 may be performed by one or more of the exemplary components of device 200 depicted in FIG. 2.

User interface module 310 may include hardware or a combination of hardware and software (e.g., processor 220) that enables DVR client 120/130 to generate user interfaces for DVR functionality. User interface module 310 may solicit and receive user input regarding recording operations by DVR client 120/130. In one implementation, user interface module 310 may present an interface to receive (e.g., from a user via remote control 140) recording instructions that tag to-be-recorded content for association with one or more user profiles. The tags may be stored, for example, within a content index in storage 330. User interface module 310 may also retrieve playlist information from playlist generator 340 to present a playlist, allow user edits to the playlist, accept user modifications to the playlist criteria, and play/present content from the playlist. In one implementation, user interface module 310 may present the playlist as a schedule for sequential DVR presentations. User interface module 310 may also automatically initiate presenting a first/next program from the playlist (e.g., in order of highest to lowest ranking). In one example, user interface module 310 may generate user interfaces described below in connection with FIGS. 5A-5D.

In another implementation, user interface module 310 may include remote access capabilities, such that a user (e.g., a parent) may access DVR client 120/130 remotely (e.g., via a remote computing device (not shown) using an Internet connection in conjunction with backend server 150). Thus, user interface module 310 may permit a user to accept recording instructions and revise playlist criteria for a user account remotely and in real time. For example, a parent may elect to remotely select a program to record/tag based on an indication (e.g., a request from a child) that special programming is occurring at a particular time. In another implementation, remotely selected programs may also include content from mobile TV, web TV, and/or other content sources.

Profile manger 320 may include hardware or a combination of hardware and software (e.g., processor 220) to collect user data relating to particular user accounts. For example, profile manager 320 may identify a particular active user profile from a group of user profiles associated with DVR client 120/130. Profile manager 320 may collect data from user interface module 310 and/or content data relating to programs provided to display device 110 or other devices, such as a video cassette recorder (VCR), a DVD player, a DVR, an external storage device, or a remote streaming video viewing device. Profile manager 320 may determine viewer tendencies based on the user data and the content data, and create/modify a profile for the individual user. In one implementation, profile manager 320 may provide certain profile data for an active profile to playlist generator 340. In another implementation, profile manager 320 may use profile information to pre-select options presented in user interface module 310. For example, profile manager 320 may automatically suggest that a program selected for recording be tagged for a particular user based on the program's similarities to other tagged content for that user. (Pre-selected options may be confirmed or changed by the user of user interface module 310.) Profile manager 320 may update a user profile in real time, such that recent user activity (e.g., viewing DVR content) may be included in subsequent playlist determinations.

Storage 330 may include hardware or a combination of hardware and software (e.g., processor 220 and storage device 250) to store content (e.g., program content and associated metadata) selected by a user of DVR client 120/130. In one implementation, storage 330 may also index stored content that may be retrieved by playlist generator 340 to generate a playlist for a particular profile. Storage 330 may monitor memory capacity and storage queues for DVR client 120/130 and/or backend server 150.

Playlist generator 340 may include hardware or a combination of hardware and software (e.g., processor 220) to retrieve data and apply one or more algorithms to recorded content associated with an active profile to generate a playlist for the profile. Playlist generator 340 may associate content with an active profile based on, for example, profile tags assigned by a user (e.g., via user interface 310). Playlist generator 340 may retrieve profile information from profile manager 320, content and memory data from storage 330 and apply them to a ranking algorithm. Playlist generator 340 may rank recorded content associated with the profile and sort content titles based on the ranking (e.g., from highest to lowest to identify recommended DVR content). In one implementation, playlist generator 340 may recalculate the playlist at particular intervals and/or upon each display request so that the playlist may include current ranking data. Algorithm criteria for ranking recorded content are described further with respect to FIG. 4.

Although FIG. 3 shows exemplary functional components of DVR client 120/130, in other implementations, DVR client 120/130 may contain fewer functional components, different functional components, differently arranged functional components, or additional functional components than depicted in FIG. 3. In still other implementations, one or more functional components of DVR client 120/130 may perform one or more other tasks described as being performed by one or more other functional components of DVR client 120/130.

Figure 4:
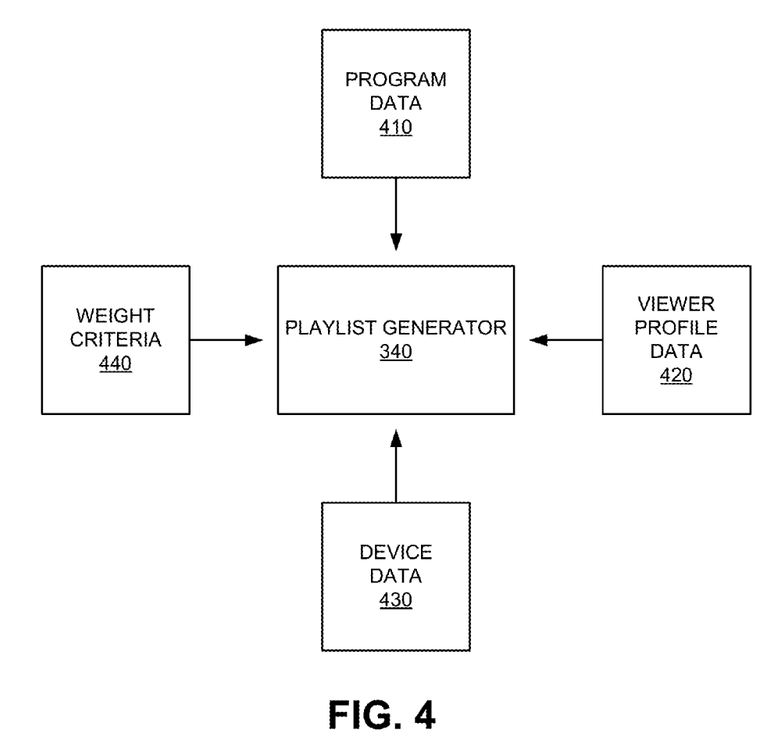
FIG. 4 is a diagram of exemplary factors provided to a watch list generator of FIG. 3.

FIG. 4 provides a diagram of exemplary factors provided to playlist generator 340. Playlist generator 340 may incorporate program data 410, viewer profile data 420, device data 430, and/or weight criteria 440 to derive a dynamic playlist for an active profile. In implementations herein, playlist generator 340 may receive program data 410, viewer profile data 420, device data 430, and/or weight criteria 440 and rank recorded DVR content based on the received data.

Program data 410 may include particular content or information about the content offered by a subscription multimedia service. In an implementation, program data 410 may include categories, classifications, and/or other metadata for the content that may be used to identify user tendencies. For example, program data 410 for a particular program may include titles, genres, actors, premiere indications, time slots, content type (passive or interactive), etc.

Viewer profile data 420 may include viewer history information gathered from DVR client 120/130. Viewer history information may include actions performed by a user that can be recorded by the DVR client 120/130, such as selecting a television program to watch, selecting a program to record, conducting a search on an electronic program guide (EPG), viewing a description of a program on an EPG, viewing a DVR recording, and the like. In an implementation, actions by a user may be recorded by DVR client 120/130 and associated with DVR client 120/130 as viewer profile data 420.

Device data 430 may include data relating to how long recorded DVR content may be stored/available for viewing. For example, device data 430 may include available memory capacity, average DVR use rates, projected memory use from scheduled recordings, pre-set time limits for DVR storage, and other data to determine a date/time at which stored content may be overwritten or expire. Device data 430 may be provided to playlist generator 340 as raw data or as a projected expiration value (e.g., two days to expiration).

Weight criteria 440 may include values (e.g., real numbers) for applying program data 410, viewer profile data 420, and device data 430. A value may be assigned for particular program data 410 (e.g., genre, broadcast date/time, content type, etc.), particular view profile data 420 (e.g., detected user actions, recording instructions, user age, etc.), and/or particular device data 430 (e.g., expiration value based on memory capacity, DVR use rate, scheduled recordings, storage time limits, etc.). In one implementation, values for weight criteria 440 may be supplied by the subscription multimedia service (e.g., values determined by a system administrator and forwarded to backend server 150 and/or DVR client 120/130). In another implementation, values for weight criteria 440 may be supplied and/or adjusted by a user via user interface 310, thus providing weight criteria specific for the user profile. The weight criteria values may be supplied/adjusted based on the proportionate importance ascribed to each type of data and applied to the data to rank particular DVR content.

In implementations described herein, playlist generator 340 may receive information from program data 410, viewer profile data 420, and device data 430. Playlist generator 340 may assign weight to the information using weight criteria 440, and generate ranked DVR content based on the weighted information.

FIGS. 5A-5D depict diagrams of exemplary user interfaces capable of being generated by DVR client 120/130. The user interfaces may include a graphical user interface (GUI) or a non-graphical user interface, such as a text-based interface. The user interfaces may receive user inputs via one or more input devices (e.g., input device 260), may be user-configurable (e.g., a user may change the size of the user interfaces; information displayed in the user interfaces; color schemes used by the user interfaces; positions of text, images, icons, windows, etc., in the user interfaces; etc.). The user interfaces may be displayed to a user via one or more output devices (e.g., display device 110).

Figure 5A:
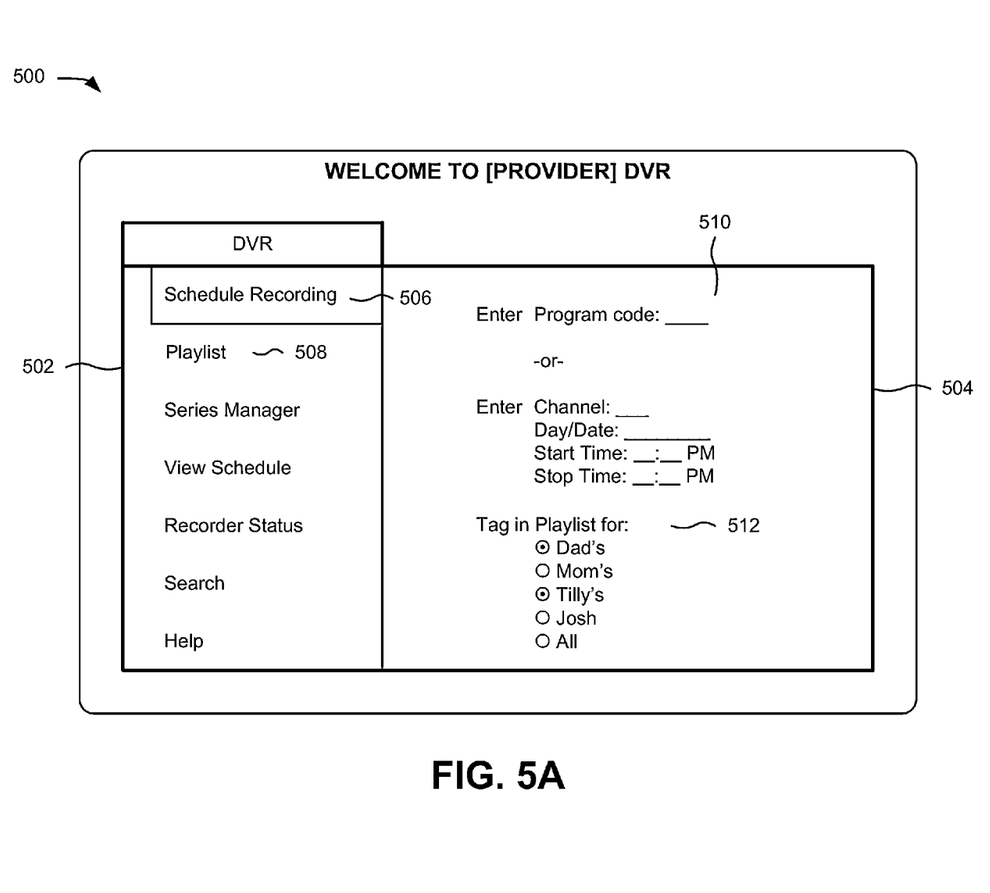
FIGS. 5A-D are diagrams of exemplary DVR user interfaces capable of being generated by the content server, the DVR client and/or the set-top box depicted in FIG. 1.

As illustrated in FIG. 5A, a user interface 500 may include a main menu section 502 and a sub-menu section 504. User interface 500 may be displayed, for example, to a user of DVR client 120/130. Information presented via user interface 500 may be selected/altered by a user of DVR client 120/130 (e.g., via remote control 140).

Main menu section 502 may include a variety of selectable information associated with DVR client 120/130. For example, main menu section 502 may provide a schedule recording entry 506, a playlist entry 508, a series manager entry, a view schedule entry, a recorder status entry, a search entry, and/or a help entry. Selection of an entry from main menu section 502 may cause a corresponding sub-menu to appear in sub-menu section 504. For example, the schedule recording entry 506, if selected (e.g., as depicted in FIG. 5A), may provide, in sub-menu section 504, scheduling options 510 associated with creation of a recording via DVR client 120/130. In one implementation, scheduling options 510 may include a tagging section 512 (e.g., "Tag in Playlist for:") that prompts a user to associate a scheduled recording with one or more user profiles. For example, as shown in FIG. 5A, scheduled recording may be tagged for (e.g., associated with) profiles for "Dad" and "Tilly." In one implementation, tags in tagging section 512 may be pre-selected by DVR client 120/130 based on, for example, input from profile manager 320.

The series manager entry, if selected, may provide information associated with managing recordation of a series (e.g., a TV series) via STB/DVR 120 and/or video client 130. The view schedule entry, when selected, may provide information associated with a schedule of television programs to be recorded by DVR client 120/130. The recorder status entry, if selected, may provide information associated with a capacity of DVR client 120/130. The search entry, if selected, may provide information that enables a user of DVR client 120/130 to search for content stored on DVR client 120/130. The help entry, if selected, may provide help information associated with DVR client 120/130.

Figure 5B:
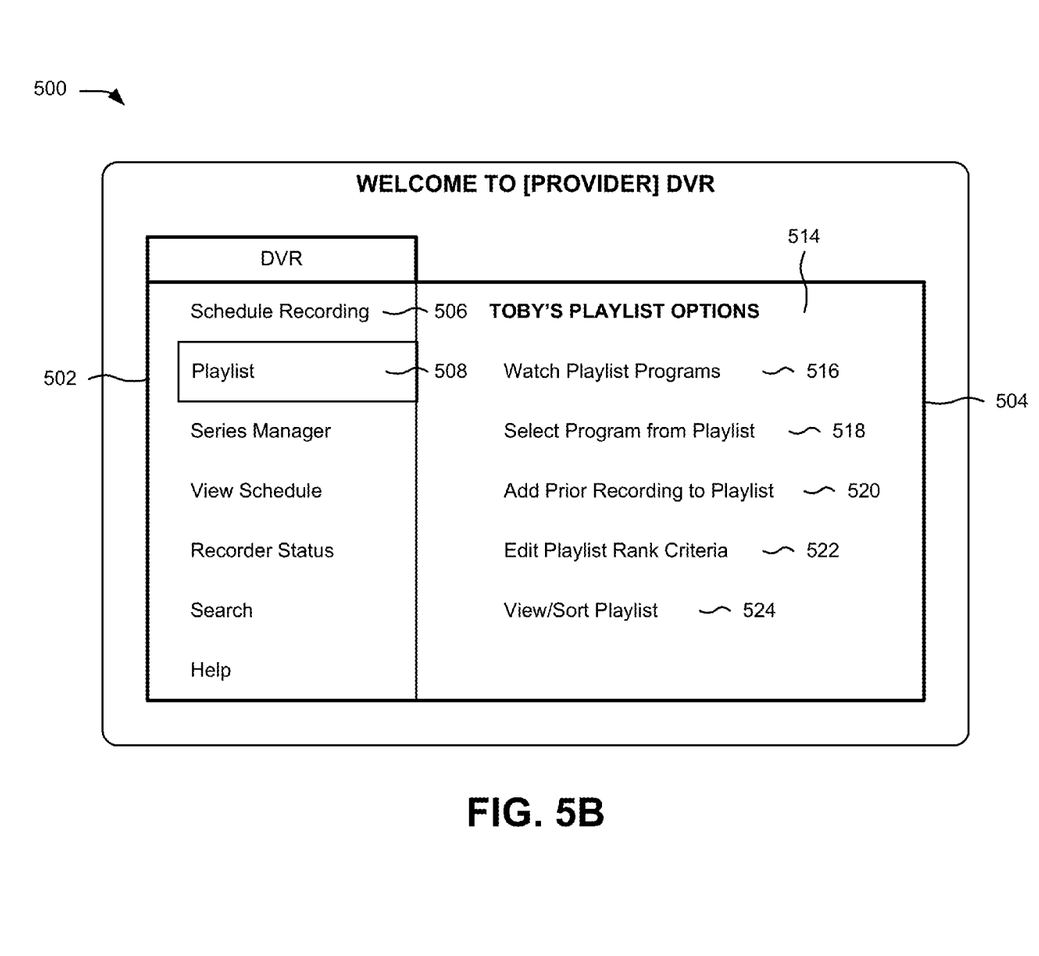

Playlist entry 508, if selected, may provide options depicted in FIG. 5B. As shown in FIG. 5B, selection of playlist entry 508 may provide information associated with programs stored on DVR client 120/130 and/or backend server 150. For example, playlist entry 508, if selected (e.g., as depicted in FIG. 5B), may provide, in sub-menu section 504, playlist options 514 associated with playlist 508. Playlist options 514 may include, for example, a watch playlist programs entry 516, a select program from playlist entry 518, an add prior recording to playlist entry 520, an edit playlist rank criteria entry 522, and a view/sort playlist entry 524.

Watch playlist programs entry 516, if selected, may launch a sequential presentation of each title on the playlist for the active profile. Thus, the highest ranked program on the playlist may be automatically presented, followed by the next highest ranked program, etc.

Select program from playlist entry 518, if selected, may provide information associated with the playlist for the active profile. For example, selection of select program from playlist entry 518 may cause the current playlist to be presented (e.g., in a separate menu section of user interface 500) so that a user may sort, scroll, and/or select a particular title to view.

Add prior recording to playlist entry 520, if selected, may provide information associated with tags for content not currently included in a playlist for the active profile. For example, selection of add prior recording to playlist entry 520 may cause titles for recordings not on current playlist to be presented (e.g., in a separate menu section of user interface 500) so that a user may tag a particular title to add to the current playlist or to another user's playlist (e.g., to recommend the prior recording to another user).

Edit playlist rank criteria entry 522, if selected, may provide information that enables a user to modify playlist ranking criteria (e.g., for playlist generator 340). For example, selection of edit playlist rank criteria entry 522 may cause ranking criteria for the current playlist to be presented (e.g., in a separate menu section of user interface 500) so that a user may alter the weights (applied, e.g., to program data 410, viewer profile data 420, and device data 430) to rank titles on the playlist.

Figure 5C:
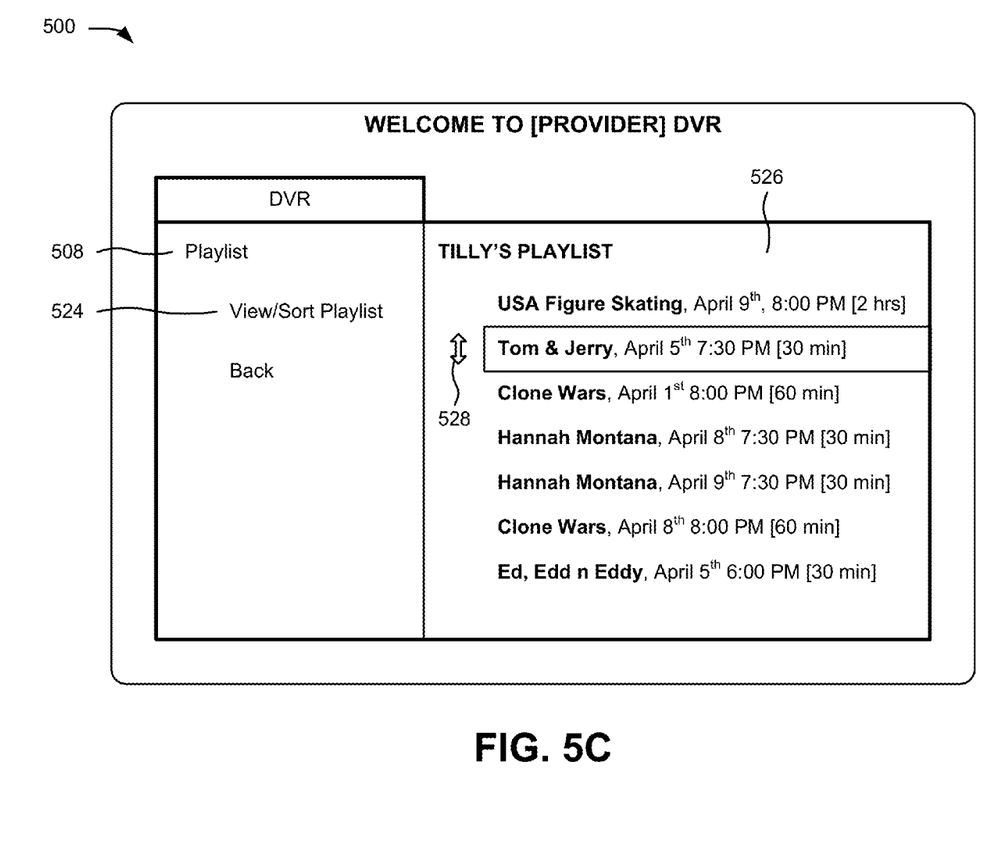

View/sort playlist entry 524, if selected, may provide options depicted in FIG. 5C. As shown in FIG. 5C, view/sort playlist entry 524 may provide information associated with a playlist order. For example, view/sort playlist entry 524 may cause a scheduling section 526 to be presented. Scheduling section 524 may provide a variety of information associated with programs that have been recorded on DVR client 120/130 (or are available to DVR client 120/130 via a DVR service of backend server 150). For example, scheduling section 526 may provide names of programs previously recorded STB/DVR 120 in order of a current ranking (e.g., "USA Figure Skating," "Tom & Jerry," "Clone Wars," and "Hannah Montana," etc.). As further shown in FIG. 5C, selection of a particular program title (e.g., "Tom & Jerry" in scheduling section 524) may cause an indicator 528 to be presented that signals that a user may move the selected program title up (e.g., higher rank) or down (e.g., lower rank) in the playlist.

Figure 5D:
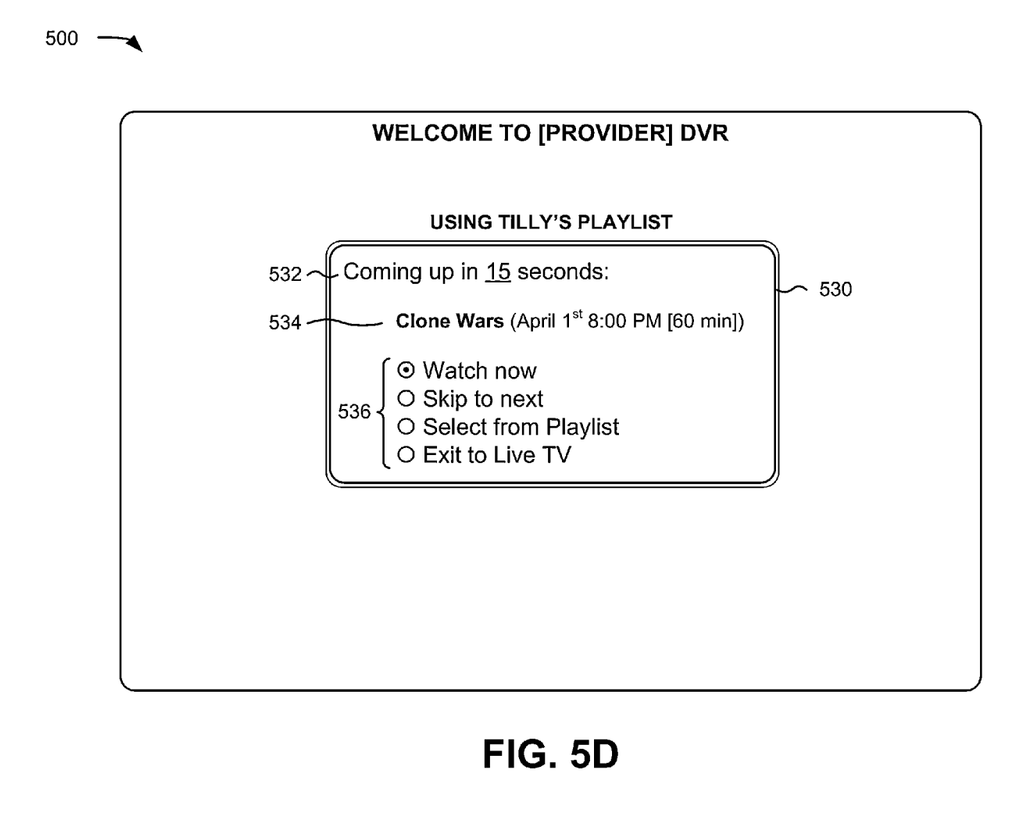

As shown in FIG. 5D, a transition screen 530 may be presented after a particular program from a playlist has been viewed. For example, watch playlist programs entry 516 (FIG. 5B) may be selected to launch a sequential presentation of each title on the playlist for the active profile. When one program is complete, transition screen 530 may be presented to the user. Transition screen 530 may include, for example, a transition period 532 indicator (e.g., "15 seconds"), a default next title 534 (e.g., "Clone Wars"), and navigation options 536. Transition period 532 may include a countdown from an initial time value (e.g., several seconds) to zero. Default next tile 534 may be the next highest ranked program on the playlist for the active profile. If no additional input is received from a user (e.g., via selection of one of navigation options 536) before transition period 532 counts down to zero, DVR client 120/130 may cause content corresponding to default next title 534 to be presented.

Navigation options 536 may include a watch now entry, a skip to next entry, a select from playlist entry, and an exit to live TV entry. The watch now entry, if selected, may cause DVR client 120/130 to begin playing the default next title 534 without waiting for the end of the transition period. The skip to next entry, if selected, may change the default next title 534 to a lower ranked program on the playlist and may restart the transition period 532. The select from playlist entry, if selected, may cause the current playlist to be presented (e.g., in a separate menu section of user interface 500) so that a user may select a particular title to view. The exit to live TV entry, if selected, may cause DVR client 120/130 to present television broadcast content on, for example, the last channel viewed by a user.

The user interface of FIGS. 5A-5D may be restricted by access controls based on the active user profile. For example, if a user profile is restricted from viewing particular channels, those restricted channels may not be made available to a user of that profile to schedule a recording (e.g., scheduling options 510 of FIG. 5A). As another example, if a user profile is restricted from accessing live TV, that particular navigation option 536 (FIG. 5D, "exit to live TV") may be excluded. A child's profile, for example, may be restricted from returning to live TV, so that instead of defaulting back to whatever may be available on live television programming, DVR client 120/130 may automatically default to a selected recorded from the playlist.

Although view schedule user interface 500 depicts a variety of user interface information, in other implementations, view schedule user interface 500 may depict more, less, different and/or differently-arranged information than depicted in FIGS. 5A-5D.

Figure 6:
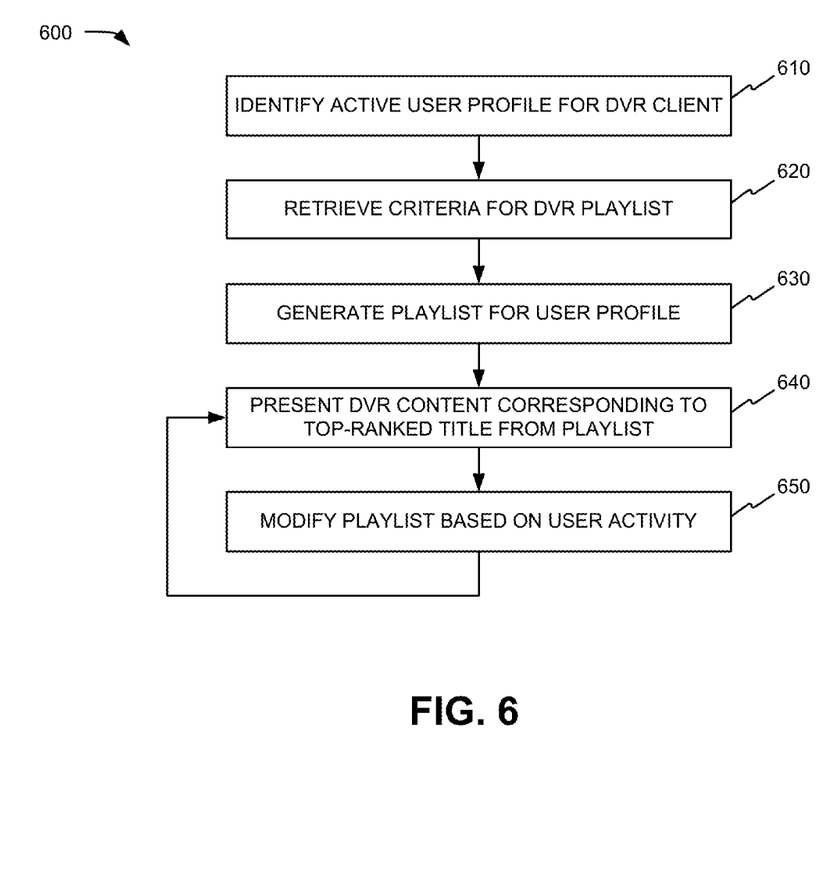
FIG. 6 is a flow chart of an exemplary process for providing video playlists for a DVR according to implementations described herein.

FIG. 6 illustrates a flow chart of an exemplary process 600 for providing a playlist for a DVR service according to an implementation described herein. In one implementation, process 600 may be performed by DVR client 120/130. In another implementation, some or all of process 600 may be performed by DVR client 120/130 in conjunction with one or more other devices, such as backend server 150.

As illustrated in FIG. 6, process 600 may include indentifying an active user profile for a DVR client (block 610). For example, DVR client 120/130 (e.g., profile manager 320) may identify (based, e.g., on a user login process) a particular active user profile from a group of user profiles associated with DVR client 120/130.

Process 600 may also include retrieving criteria for a DVR playlist (block 620) and generating a playlist for the user profile (block 630). For example, DVR client 120/130 (e.g., playlist generator 340) may retrieve data and apply one or more algorithms to recorded content associated with an active profile to generate a playlist for the profile. Playlist generator 340 may associate content with an active profile based on, for example, profile tags assigned by a user (e.g., via user interface 310). Playlist generator 340 may retrieve profile information from profile manager 320, content and memory data from storage 330 and apply them to a ranking algorithm. The playlist may rank recorded content associated with the profile and sort content titles based on the ranking.

Process 600 may also include presenting DVR content corresponding to a top-ranked title from the playlist (block 640). For example, DVR client 120/130 (user interface module 310) may also retrieve playlist information from playlist generator 340 to present a playlist, allow user edits to the playlist, accept user modifications to the playlist criteria, and play/present content from the playlist. In one implementation, user interface module 310 may present the playlist as a playlist for sequential DVR presentations. User interface module 310 may also automatically initiate presenting a first/next program from the playlist (e.g., in order of highest to lowest ranking).

Process 600 may also include modifying the playlist based on user activity (block 650). For example, DVR client 120/130 (e.g., profile manager 320) may provide certain profile data for an active profile to playlist generator 340. Profile manager 320 may update a user profile in real time, such that recent user activity (e.g., viewing DVR content) may be included in subsequent playlist determinations. DVR client 120/130 (e.g., playlist generator 340) may recalculate the playlist at particular intervals and/or upon each display instance so that the playlist may include current ranking data.

Systems and/or methods described herein may provide a computing device that identifies an active user profile, from multiple user profiles, associated with the device and retrieves from an index of stored DVR content, titles for the stored DVR content that are associated with the user profile. The computing device may rank the titles associated with the user profile and may generate a list of the titles based on the ranking. The computing device may provide, via a display device and based on the order of the list of the indicators, recommended titles of DVR content for a user to view.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by a computing device, a user profile associated with a digital video recorder (DVR);
   identifying, by the computing device, titles of recordings stored by the DVR and associated with the user profile;
   determining, by the computing device, particular data that indicates how long one or more of the recordings are available for viewing;
   determining, by the computing device, one or more weights to be applied to the particular data that indicates how long the one or more of the recordings are available for viewing, the one or more weights being one or more values supplied by a subscription multimedia service;
   determining, by the computing device, a ranking of the titles based on the one or more weights and the particular data that indicates how long the one or more of the recordings are available for viewing;
   generating, by the computing device, a list of the titles based on the ranking; and
   providing, by the computing device and via a display device, a particular recording, of the recordings, for a user to view based on an order of the list of the titles.

2. The method of claim 1, where determining the ranking of the titles includes:
   retrieving criteria associated with the user profile,
      the criteria specifying applying a particular weight, of the one or more weights, to the data that indicates how long the one or more of the recordings are available, and
   determining the ranking based on the criteria.

3. The method of claim 2, where the criteria is specific to the user profile.

4. The method of claim 1,
   where the method further comprises:
      determining metadata associated with the recordings; and
      determining user profile data associated with at least one of a viewing history or a recording history of the user, and
   where determining the ranking comprises:
      determining the ranking of the titles based on the one or more weights, the particular data that indicates how long the one or more of the recordings are available for viewing, the metadata, and the user profile data.

5. The method of claim 1, further comprising:
   retrieving the particular recording based on a title of the particular recording being a top-ranked title in the list of the titles.

6. The method of claim 1, further comprising:
   receiving, from the user, input that modifies the user profile,
   modifying the user profile based on the input to obtain a modified user profile,
   determining an updated ranking of the titles associated with the modified user profile,
   generating an updated list of the titles based on the updated ranking, and
   providing another recording, of the recordings, or other information based on the updated list of the titles.

7. The method of claim 1, where the computing device comprises a set-top box (STB) and the DVR.

8. The method of claim 1, further comprising:
   receiving a request to record television content on the DVR;
   presenting, to a user via the display device, indicators of multiple user profiles,
      the multiple user profiles including the user profile; and
   receiving, via selection of one or more of the indicators, user input to associate a recording of the television content with one or more of the multiple user profiles.

9. The method of claim 8, further comprising:
   pre-selecting one of the indicators of the multiple user profiles based on information associated with the television content and data from the multiple user profiles.

10. The method of claim 1,
    where a first title of the particular recording is a highest ranked title in the list of the titles, and
    where the method further comprises:
       initiating, after providing the particular recording, presentation of another recording, of the recordings, associated with a second title that is ranked, in the list of the titles, right after the highest ranked title.

11. A device comprising:
a processor to:
  identify a user profile, from multiple user profiles, associated with the device;
  retrieve indicators for recordings that are stored by a digital video recorder (DVR) and are associated with the user profile;
  determine particular data that indicates how long one or more of the recordings are available for viewing;
  determine a weight to be applied to the particular data that indicates how long the one or more of the recordings are available for viewing, the weight being a value supplied by a subscription multimedia service;
  determine a ranking of the indicators based on the weight and the data that indicates how long the one or more of the recordings are available for viewing;
  generate a list of the indicators based on the ranking; and
  provide, via a display device and based on an order of the list of the indicators, titles of one or more of the recordings.

12. The device of claim 11, where, when determining the ranking of the indicators, the processor is to:
  retrieve, from a memory of the device, criteria that specifies using the data that indicates how long the one or more of the recordings are available, and
  determine the ranking of the indicators based on the criteria.

13. The device of claim 11, where, when determining the ranking of the indicators, the processor is to:
  retrieve, from a backend server, criteria that specifies using the data that indicates how long the one or more of the recordings are available, and
  determine the ranking of the indicators based on the criteria.

14. The device of claim 13, where the criteria is specific to the user profile.

15. The device of claim 11, where the device comprises a set-top box (STB) and the DVR.

16. The device of claim 11, where the processor is further to:
  receive information regarding a selection of a particular title of the titles;
  present, via the display device, a first recording, of the one or more of the recordings, associated with the particular title; and
  present, via the display device and after presenting the first recording, a second recording, of the one or more of the recordings, that is associated with a highest ranked indicator of the list of the indicators.

17. The device of claim 11, where the processor is further to:
  receive, from the user, input that modifies the weight to be applied to the particular data that indicates how long the one or more of the recordings are available for viewing,
  modify the weight based on the input to obtain a modified weight,
  determine an updated ranking of the indicators based on the modified weight,
  generate an updated list of the indicators based on the updated ranking, and
  provide, based on the updated list of the indicators, information regarding one or more other recordings of the recordings.

18. The device of claim 17, where the input from the user is received from a remote device via a backend server.

19. The device of claim 12,
where the processor is further to:
  determine other data,
    the other data including at least one of metadata associated with the recordings or user profile data associated with at least one of a viewing history or a recording history of a user associated with the user profile; and
  determine another weight to be applied to the other data, and
  determining the ranking based on the weight, the data that indicates how long the one or more of the recordings are available for viewing, the other weight, and the other data.

20. A non-transitory computer-readable medium storing instructions, the instructions comprising:
  one or more instructions that, when executed by at least one processor, cause the at least one processor to:
    receive one or more requests to use a digital video recorder (DVR) to record and store one or more recordings of multimedia content;
    present indicators of multiple user profiles associated with the DVR;
    receive information regarding a selection of one or more of the indicators to associate the one or more recordings with one or more of the multiple user profiles that are associated with the one or more of the indicators;
    identify an active user profile of the one or more of the multiple user profiles;
    retrieve titles of the one or more recordings that are associated with the active user profile;
    determine particular data that indicates how long one or more of the recordings are available for viewing;
    determine a weight to be applied to the particular data that indicates how long the one or more of the recordings are available for viewing, the weight being a value supplied by a subscription multimedia service;
    determine a ranking of the titles based on the weight and the data that indicates how long one or more of the one or more recordings are available for viewing;
    generate a list of the titles based on the ranking; and
    provide a particular recording of the one or more recordings or information associated with the particular recording based on an order of the list of the titles.

21. The non-transitory computer-readable medium of claim 20, where the instructions further comprise:
  one or more instructions that, when executed by the at least one processor, cause the at least one processor to:
    initiate, after providing the particular recording or the information associated with the particular recording, presentation of another recording, of the one or more recordings, that is associated with a title that is ranked after a title of the particular recording in the list of the titles.

22. The non-transitory computer-readable medium of claim 21, where the instructions further comprise:
  one or more instructions that, when executed by the at least one processor, cause the at least one processor to:
    retrieve the particular recording and the other recording from one of a local memory or a remote server.

23. The non-transitory computer-readable medium of claim 20, where the weight is selected by a user of the DVR who is associated with the active user profile.

* * * * *